United States Patent [19]

Pritchett

[11] 4,284,163

[45] Aug. 18, 1981

[54] COUPLING MEANS FOR HORIZONTAL VIBRATOR WITH TOOTH-LIKE PROJECTIONS

[75] Inventor: William C. Pritchett, Plano, Tex.

[73] Assignee: Atlantic Richfield Company, Los Angeles, Calif.

[21] Appl. No.: 108,205

[22] Filed: Dec. 28, 1979

[51] Int. Cl.³ ............................................. G01V 1/053
[52] U.S. Cl. .................................... 181/113; 181/401; 248/678
[58] Field of Search .................. 181/113, 140; 367/75; 248/545, 677, 678

[56] References Cited

U.S. PATENT DOCUMENTS

| 2,557,960 | 6/1951 | Gerhardt | 89/37 L |
|---|---|---|---|
| 3,046,843 | 7/1962 | Rowe | 248/678 |
| 3,159,233 | 12/1964 | Clynch et al. | 181/401 |
| 3,716,111 | 2/1973 | Lavergne | 181/401 |
| 4,050,540 | 9/1977 | Cholet et al. | 181/401 |
| 4,135,598 | 1/1979 | Stafford | 181/401 |
| 4,143,736 | 3/1979 | Fair | 367/75 |

*Primary Examiner*—Nelson Moskowitz
*Attorney, Agent, or Firm*—Robert M. Betz

[57] ABSTRACT

The present invention relates to means for coupling the horizontally directed force of a seismic transducer into the earth with a downward-going shear wave. The coupling means consists of a plurality of downwardly-convergent, wedge-shaped, earth-engaging cleats dependently attached to the transducer support means, at least some of the cleats being provided with a plurality of downwardly projecting teeth, which may be mounted on or form a part of field replaceable cleat inserts. Extremely high unit pressures are developed on these teeth due to the hold down weight of the transducer. As a result, good earth penetration is achieved immediately on even very hard rock surfaces. The alignment of the teeth is such as to encourage the development of rock flaws or cracks oriented to accommodate the entry of the supporting cleats.

4 Claims, 8 Drawing Figures

COUPLING MEANS FOR HORIZONTAL VIBRATOR WITH TOOTH-LIKE PROJECTIONS

BACKGROUND OF THE INVENTION

1. Field of the Invention

This invention relates generally to transducers for inducing vibratory signals in an elastic medium such as the earth amd more particularly, to an improved means for coupling the horizontally directed force of a seismic transducer into the earth.

2. Description of the Prior Art

In applicant's co-pending commonly assigned applications, Ser. Nos. 83,070 and 108,206 there are disclosed means for coupling the horizontally directed force of a seismic transducer into the earth consisting of a plurality of downwardly-convergent, wedge-shaped, earth-engaging cleats dependently attached to the transducer support. The horizontal bottom edges of the cleats extend horizontally and are oriented transversely to the direction of transducer motion. In these applications it is disclosed that the cleats may be of differing depth and sharpness, the cleats being preferably configured so that the total edge length of the sharper and deeper cleats is less than that of the blunter and shallower ones to ensure high vertical loading on initial contact with hard surfaces.

The present invention retains all of the advantageous features of the subject matter of the two referenced applications but seeks to further extend the versatility of these designs.

It is therefore a general object of this invention to provide an improved means of coupling the horizontally directed force of a transducer into an elastic medium such as the earth.

It is a further object of this invention to provide means for coupling the horizontally directed force of a transducer into the earth which improves penetration in and coupling to hard rock surfaces.

It is yet another object of this invention to provide means for coupling the horizontally directed force of a transducer into the earth by means which are well adapted both for field modification and for replacement of damaged or worn parts.

Other and further objects and advantages of the invention will become apparent upon consideration of the following detailed description and drawings.

In summary, in accordance with the preferred embodiment of the present invention means are provided for coupling the energy of a horizontal vibrator into the earth comprising a plurality of downwardly-convergent, earth-engaging cleats dependently supported from said transducer. The cleats are in the form of inverted wedges each having a pair of lateral load-bearing faces converging to form a horizontal cleat edge extending transversely to the direction of transducer motion. A plurality of downwardly-projecting teeth are affixed to the horizontal edges of at least some of such cleats. In one embodiment the teeth are mounted on or form a part of replaceable cleat inserts. The teeth are narrow in relation to the total edge length of the cleats. The resultant high loading on these teeth due to the hold-down weight of the transducer enables instant penetration and good coupling of the transducer even on extremely hard rock surfaces.

DETAILED DESCRIPTION OF THE PREFERRED EMBODIMENTS

Figure 1:
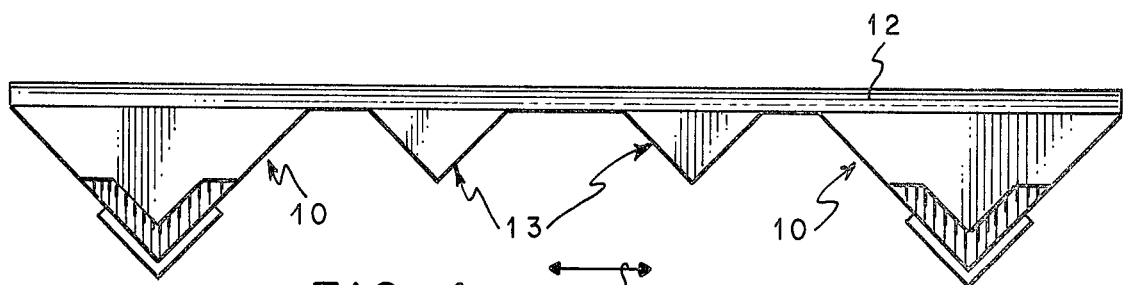
FIG. 1 represents in semi-diagrammatic form an end elevational view of a transducer earth coupling means in accordance with a preferred embodiment of this invention.
Figure 2:
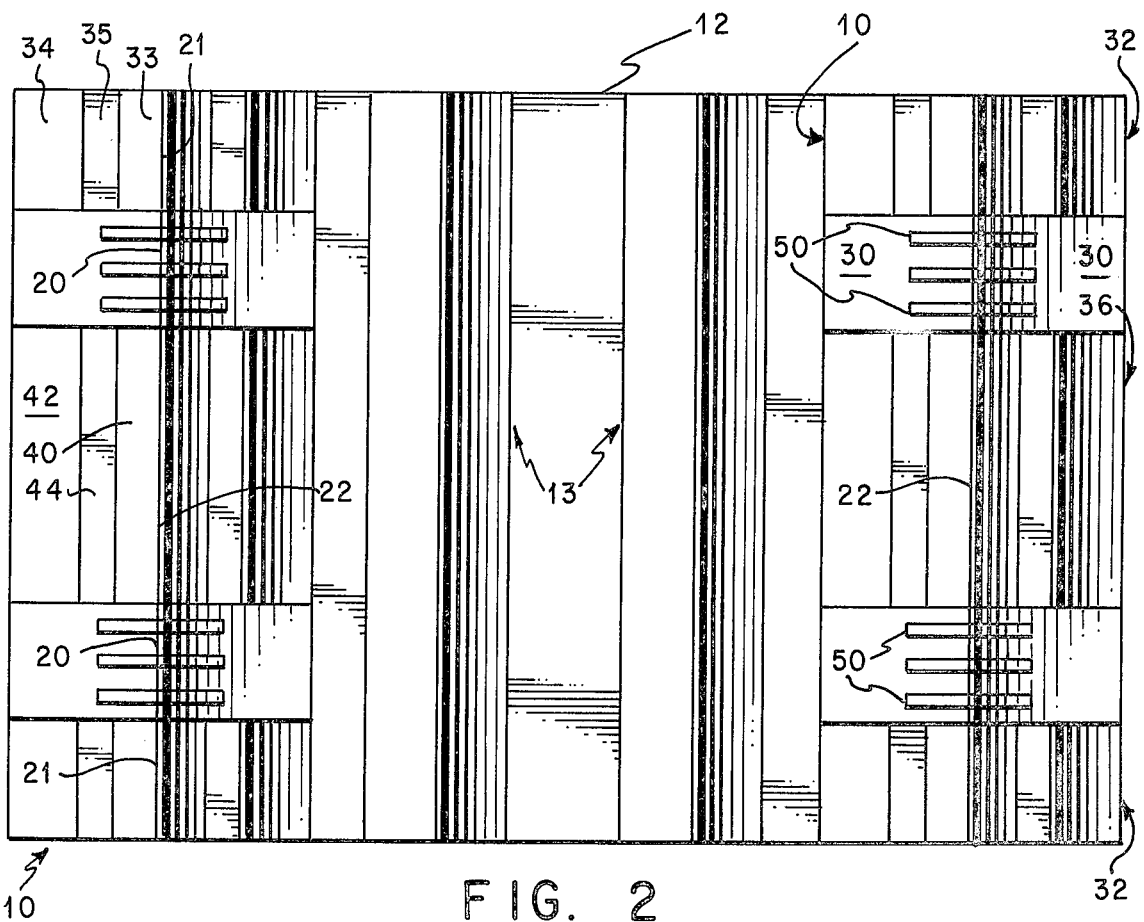
FIG. 2 represents in semi-diagrammatic form a bottom plan view of the transducer earth coupling means of FIG. 1.
Figure 3:
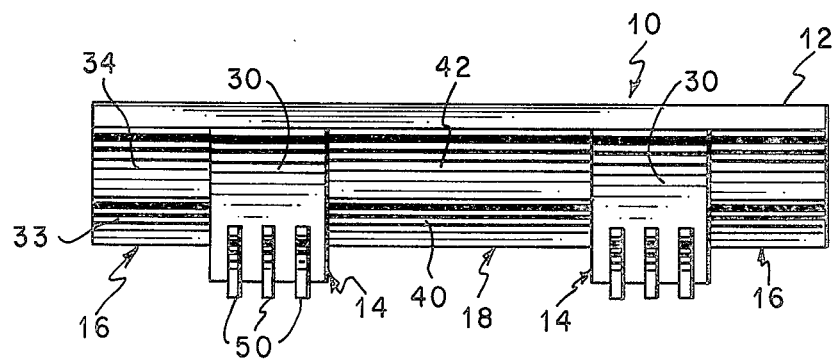
FIG. 3 represents in semi-diagrammatic form a side elevational view of the transducer earth coupling means of FIG. 1.
Figure 4:
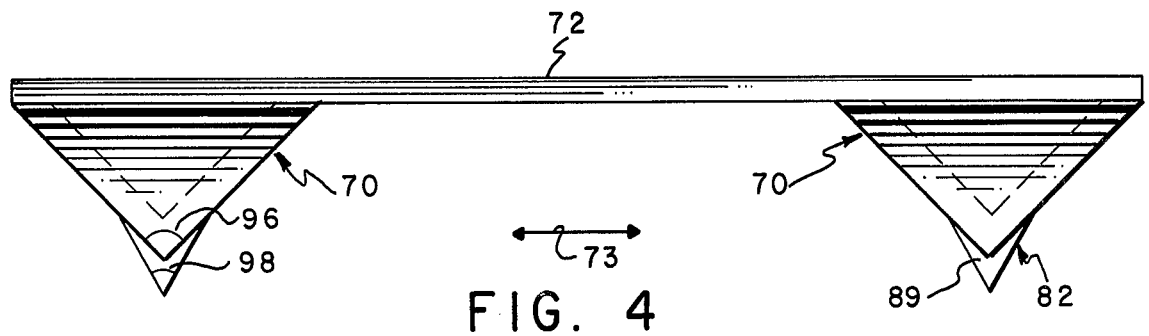
FIG. 4 represents in semi-diagrammatic form an end elevational view of a transducer earth coupling means in accordance with an alternate embodiment of this invention.
Figure 5:
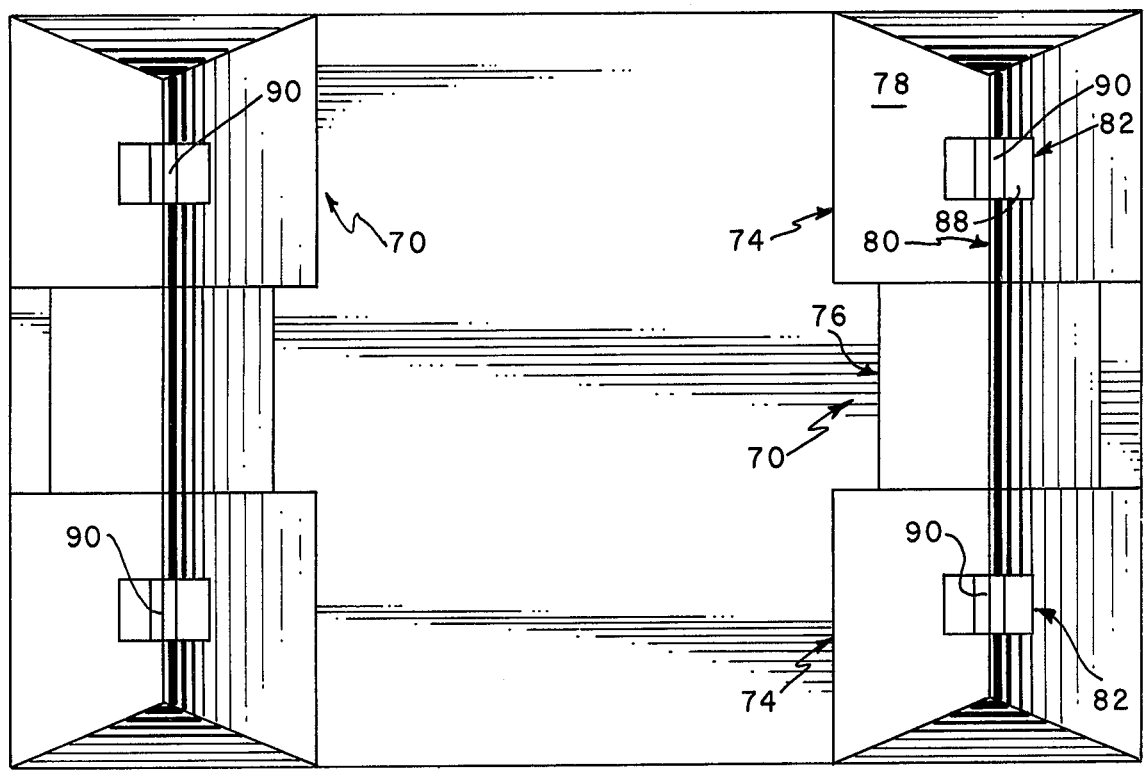
FIG. 5 represents in semi-diagrammatic form a bottom plan view of the transducer earth coupling means of FIG. 4.
Figure 6:
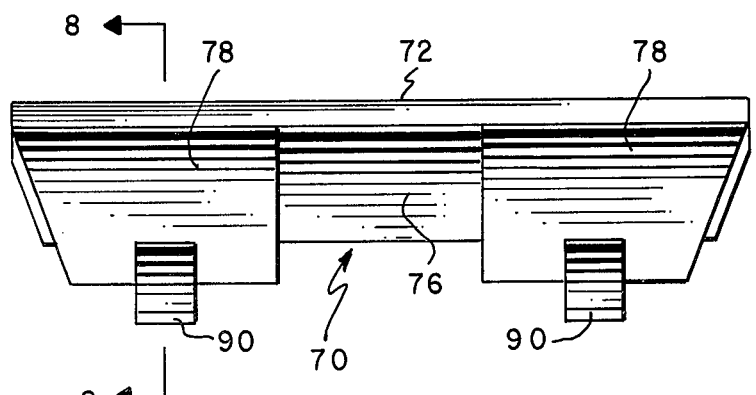
FIG. 6 represents in semi-diagrammatic form a side elevational view of the transducer earth coupling means of FIG. 4.
Figure 7:
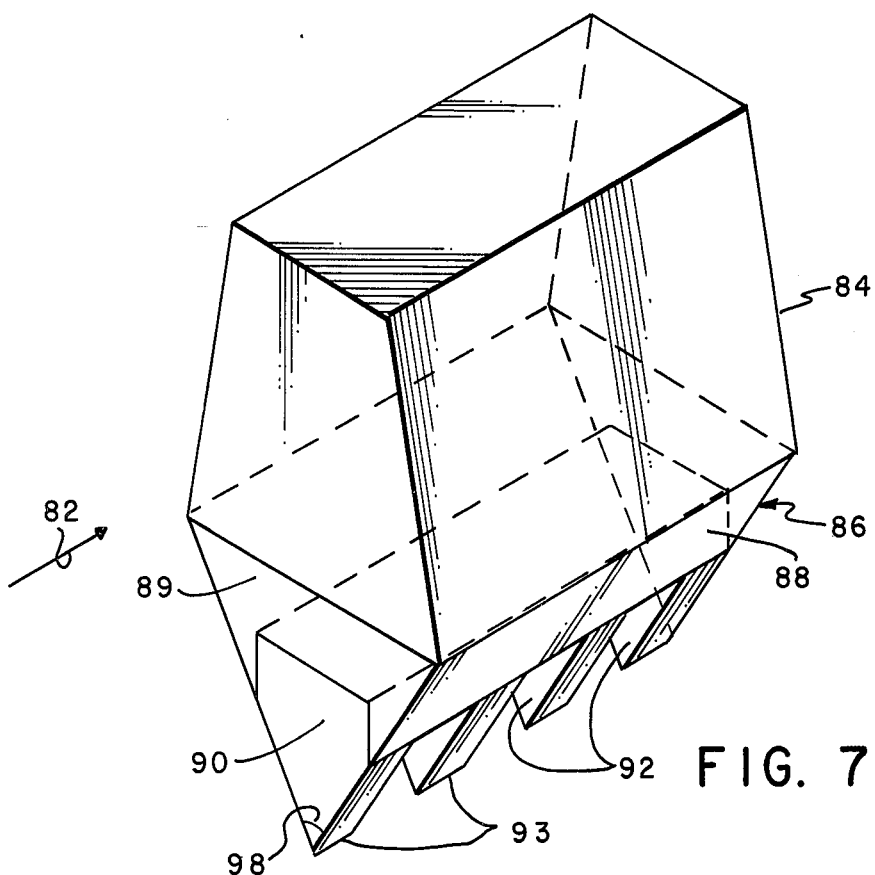
FIG. 7 represents an isometric view, partially diagrammatic, of an individual cleat insert in accordance with the alternate embodiment of FIG. 4.
Figure 8:
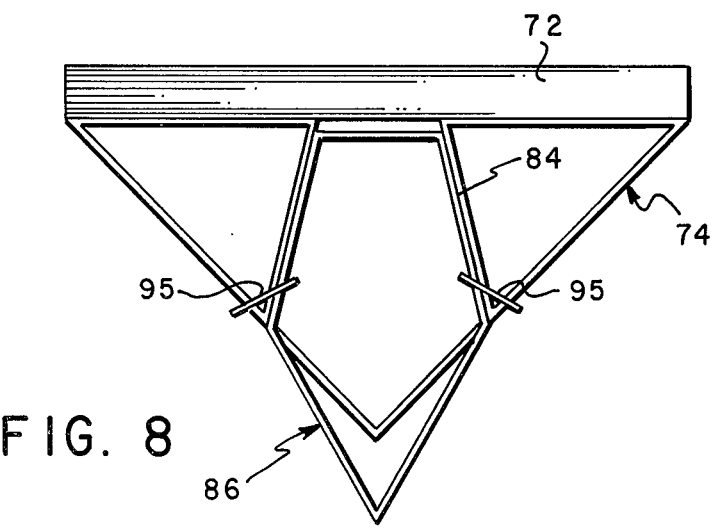
FIG. 8 represents a sectional view, partially diagrammatic, taken along the line 8—8 in FIG. 6.

With reference now to the drawings, in particular the FIGS. 1, 2 and 3, coupling means for a horizontal shear wave transducer are depicted generally in accordance with a preferred embodiment of this invention. A pair of cleat structures either of which is generally indicated by the reference numeral 10 are dependently supported in any convenient manner from support means such as base 12 for a horizontal vibrator (not shown). Intermediate cleat structures 13 as shown are generally desirable for prevention of bottoming out of the base plate 12, but form no part of the present invention. Each cleat structure 10 consists of a plurality of inverted wedge-shaped cleat means of differing depth and configuration. As shown in FIGS. 1, 2 and 3, these cleat means are joined together contiguously. They may also be formed as a single unit extending from front to back of base 12 to guard against possible bending near the center of the side of base plate 12. Other arrangements are clearly possible wherein the cleats in each structure 10 are spaced apart.

In what follows, the same reference numeral is assigned to all cleat means of identical configuration and to the identical components or features thereof, regardless of the location of such cleat means along either of cleat structures 10. Individual cleat means may be given structural rigidity by means of spaced-apart, internal reinforcing members (not shown) as is well known in this art. Although the number of the variations in depth, edge length and sharpness of cleat means in each cleat structure 10 is not critical in this invention, for illustrative purposes three different configurations of such cleat means have been shown in each of structures 10.

It will be seen most readily in FIG. 3 that each cleat structure 10 includes a pair of spaced-apart cleat means 14 of greatest depth, a pair of cleat means 16 of least depth at opposite ends of cleat structure 10, and a single cleat means 18 also of least depth in the center of cleat structure 10. Each of cleat means 14, 16 and 18 is formed with vertical and parallel end surfaces and a pair of converging lateral load-bearing surfaces which join to form a bottom cleat edge extending horizontally.

As best seen in FIG. 2, the bottom edges of cleat means 14, 16 and 18 are indicated respectively by reference numerals 20, 21 and 22. Edges 20 through 22 are axially aligned, though not all at the same depth below base 12, and extend transversely to the direction of the horizontal force to be applied by the transducer, shown in FIG. 1 by the arrows indicated by the reference numeral 25.

As best seen in FIGS. 1 and 2, edges 20 of cleat means 14 are formed by the junction of pairs of convergent lateral surfaces 30 which are rectangular and planar in shape. Pairs of lateral surfaces 32 converge to form edges 21 of cleats 16. Each surface 32 consists of two sloping faces 33 and 34 and an intermediate horizontal face 35. Pairs of load-bearing lateral surfaces 36 converge respectively to form edge 22 of cleat means 18 situated between the pair of cleat means 14 in the center of cleat structure 10. Each surface 36 comprises spaced-apart sloping faces 40 and 42 and intermediate horizontal face 44.

The purpose of providing cleat means of differing depth in the apparatus of this invention and of giving the shallower of such cleat means lateral surfaces of a staircase configuration is adequately spelled out in the previously referenced application Ser. Nos. 83,070 and 108,206. The improvement with which the present invention is particularly concerned extends and refines the advantages inherent in the structure detailed thus far.

In accordance with the invention a plurality of "V" shaped teeth 50 are affixed to each of the deepest cleat means 14 as shown so that they project downwardly from the cleat edges 20. Teeth 50 may, for example, be made of square one-inch hardened steel, tipped with tungsten carbide and preferably welded to the lateral surfaces 30 of cleat means 14. The outer lateral faces 51 of teeth 50 are not necessarily parallel to surfaces 30, and may be angled to make teeth 50 as sharp as desired.

If constructed as in the above example, twelve teeth 50 as shown may initially provide an effective total load-bearing surface of about three square inches. If the hold-down weight of the transducer to be coupled to the earth is, for purposes of illustration, 48,000 pounds, the vertical bearing stress applied by means of teeth 50 may be 16,000 psi. In this way hard rock surfaces may be penetrated and good initial coupling may be achieved. By providing a plurality of such teeth 50 disposed along cleat edges 20, it is possible to develop flaws or cracks in a hard rock surface which will thereafter accomodate the entry of the underlying cleats 14, thus insuring effective coupling. If desired, the teeth 50 may be refurbished, tipped or even replaced entirely in the field without disturbing the underlying cleats.

It should be emphasized that within the scope of this invention, teeth similar to teeth 50 may be applied to the bottom horizontally-extending edge of any set of generally wedge-shaped cleats similar to those described above. That is to say, there is no necessity that the cleat means must be of differing depth or that the "staircase" construction for some of such cleat means as described herein be maintained. If desired, for example, all of such cleat means may have planar rectangular lateral load-bearing surfaces and all may be of equivalent depth. The initial advantage to be achieved by means of load-bearing means such as teeth 50 will therefore apply with a variety of the cleat structures generally as described.

An alternate embodiment of this invention is seen with reference to FIGS. 4, 5, 6, 7 and 8. In this embodiment a pair of rows 70 of cleat means are dependently supported from a transducer base plate 72 extend transversely to the direction of transducer motion indicated by arrows 73. Each row 70 includes at either end a pair of cleat means 74 and optional intermediate cleat means 76. Each of cleat means 74 consists of an inverted wedge-shaped cleat provided with downwardly convergent trapezoidal surfaces 78 which join to form a horizontally extending cleat edge 80.

Located centrally with respect to each of cleat means 74 is a replaceable downwardly projecting cleat insert 82. As best seen with reference to FIGS. 7 and 8, cleat insert 82 has a generally rectangular tapering base 84 adapted to extend within cleat means 74 upwardly toward base plate 72, and a lower pyramidal tip 86. Tip 86 may consist of a pair of convergent planar convergent walls 88, parallel end plates 89, and a tooth-bearing bar 90. Walls 88 and plates 89 may, for example, be constructed of $\frac{1}{2}$" hardened steel plate converging to an edge about 5" in length. The bottom of cleat insert 82 may be recessed to receive the tooth-bearing bar 90, seen in detail in FIG. 7. The bar 90 is notched to form a plurality of narrow teeth 92 whose edges 93 are aligned transversely to the direction of transducer motion 73, and which may be welded in position. The edges 93 are collectively adapted to generate rock flaws oriented to receive inserts 82 and in turn cleat means 74.

The base 84 is preferably tapered in an upward direction so to provide a wedge fit within internal structural support members (not shown) of cleat means 74. In use, the weight of the transducer therefore helps to seat the insert 82 in position. Insert 82 may be anchored within cleat means 74 by means of a pair of slanting set screws 95 extending between these members. Tip 86 may be as sharp as desired and the cross-sectional area of base 84 can be reduced as desired. As a practical example, with reference to FIG. 4, the cleat means 74 may be given an interior edge angle 96 of about 90° while the teeth 92 can readily be given an interior edge angle 98 of 60°. The advantage of this construction is that a field replacement or modification of inserts 82 and therefore teeth 92, is made possible without removal of or interference with the connection of cleat means 74 to the base plate 12. The end plates 89 may be provided with matching holes or notches (not shown) to receive a bar or pry to remove inserts 82. As in the case of the previously described embodiment of this invention, the teeth 92 are adapted to develop very high unit pressures against hard rock surfaces, thereby enabling good penetration and good shear wave coupling.

It should be understood that the particular embodiments of this invention described and illustrated are illustrative only and are not to be regarded as limiting. Consequently, many variations in the shape and construction of the various component parts of this invention will readily occur to those skilled in the art without departing from the scope of this invention as set forth in the appended claims.

What is claimed is:

1. In a transducer for inducing shear waves in an elastic medium, including a horizontally movable support means adapted to couple energy of such transducer into said medium, the improvement comprising a plurality of cleat means of differing depth on such support structure for engaging the surface of said medium, each of said cleat means consisting of a downwardly convergent, wedge-shaped structure adapted to form a horizontal bottom cleat edge extending transversely to the direction of transducer motion, and a plurality of tooth-like projections affixed respectively to at least some of said cleat means so as to extend downwardly from the deepest of said cleat edges, the total load-bearing surface of said tooth-like projections being very small relative to that of said cleat means.

2. Apparatus as in claim 1 wherein the edges of said tooth-like projections are aligned with said cleat edges.

3. In a transducer for inducing shear waves in an elastic medium including the horizontally movable support means adapted to couple the energy of said transducer into said medium the improvement comprising a plurality of cleat means on said support structure for engaging the surface of said medium each of said plurality of cleat means comprising (a) a pair of like quadrangular lateral plates downwardly convergent from said support means to form a cleat edge adapted to extend horizontally and transversely to the direction of horizontal transducer motion, and (b) a pair of triangular opposed end plates respectively interconnected between the adjacent convergent edges of said lateral plates, and (c) a plurality of "V" shaped projections affixed to the outer surfaces of said lateral plates and extending downwardly therefrom, said projections being configured such that they present a total vertical bearing surface very small in relation to that of said cleat means.

4. In a transducer for inducing shear waves in an elastic medium including the horizontally movable support means adapted to couple the energy of said transducer into said medium the improvement comprising a plurality of cleat means on said support structure for engaging the surface of said medium, each of said plurality of cleat means comprising (a) a pair of like quadrangular lateral plates downwardly convergent from said support means to form a cleat edge adapted to extend horizontally and traversely to the direction of horizontal transducer motion, and (b) a pair of triangular opposed end plates respectively interconnected between the adjacent convergent edges of said lateral plates, (c) tooth-bearing means interfitted detachably within said cleat means, said teeth being adapted to extend beneath said cleat means in earth-engaging position, the edges of said teeth being aligned with said cleat edge.

* * * * *